Feb. 6, 1940.  E. DOZLER  2,189,579
ELECTRIC BRAKING SYSTEM
Filed Nov. 7, 1938
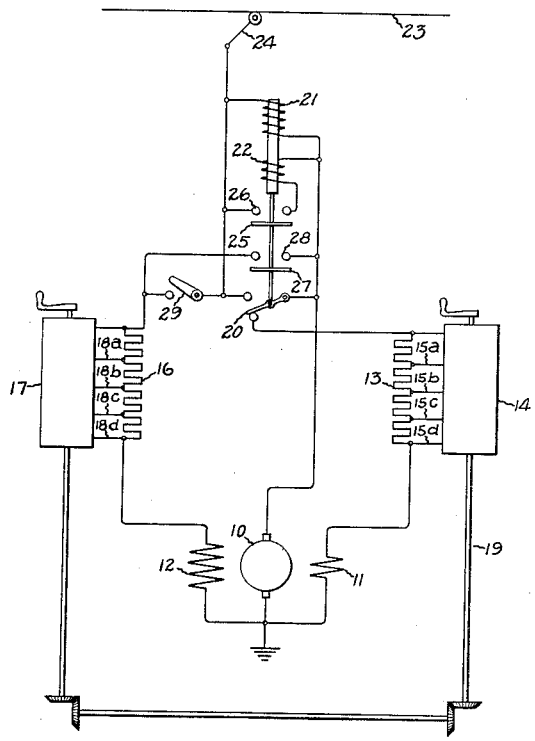
Inventor:
Ernst Dozler,
by Harry E. Dunham
His Attorney.

Patented Feb. 6, 1940

2,189,579

UNITED STATES PATENT OFFICE 2,189,579

ELECTRIC BRAKING SYSTEM

Ernst Dozler, Berlin-Steglitz, Germany, assignor to General Electric Company, a corporation of New York Application November 7, 1938, Serial No. 239,375
In Germany December 14, 1937

7 Claims. (Cl. 172—179)

This invention relates to electric braking systems having particular application to electric traction motors and the like, and has for its object a simple and reliable regenerative and dynamic braking system wherein the motor is provided with both shunt and series field windings.

In known regenerative and short circuit or dynamic braking systems for series motors, the series fields of the motors are connected in series with the braking resistance in parallel with the armatures of the motors and to supply source. Before the connection with the supply source, the motors are self-excited through their fields and the braking resistance for short circuit braking. When the voltage of the armatures exceeds the voltage of the supply source, the armatures are connected to the supply source for regenerative braking. In this system, the excitation of the field windings is supplied through the braking resistances from the motor armatures or the supply source as the case may be.

With decreasing driving speed, the excitation of the field windings is increased by a decrease in the braking resistance in order to maintain the braking effect. If for some reason no current is fed back into the supply source, for example due to derailment of the trolley or car-load current collector, the current generated by the armatures flows through the field windings for the short circuit braking exclusively. This change in the connections from regenerative to short circuit braking is performed by an automatic switching device responsive mainly to the preponderance of the voltage of the motors with respect to the voltage of the supply source and on the direction of the current.

Since at decreasing speed the braking resistance is already decreased for purposes of regenerative braking regulation, the braking resistance has, when the braking is changed, the correct value for the subsequent short circuit braking in order to avoid a decrease of braking effort or a sudden increase of braking effort.

The energization of the series fields, however, requires a relatively large current which is not recovered during regenerative braking with the consequent decrease in the actual recovery of current during regenerative braking. In accordance with this invention, the current recovery is increased by utilizing a shunt winding for field excitation of the motors after the self-excitation through the series field windings has taken place, the shunt winding requiring only a fraction of the current required for the series windings. This change of excitation takes place together with the connection of the driving motor armatures to the supply source and at the same time, the series windings are disconnected. The substitution of the shunt windings for the series windings is, according to the invention, only temporary and takes place only so long as the regenerative braking is effective. When the regenerative braking is ended either automatically or by manual control, the prior existing condition of self-excitation through the series windings in the short circuit braking connection is resumed.

For a more complete understanding of the invention, reference should be had to the accompanying drawing, the single figure of which is a simplified diagram of an electric railway braking system embodying this invention.

Referring to the drawing, the invention is shown as applied to a railway motor system comprising a direct current motor consisting of an armature 10 provided with a series field winding 11 and a shunt or separately excited field winding 12. The motor is provided with a short circuit or dynamic braking resistance 13 connected in series with the series field winding 11 and which may be excluded from the series field circuit by suitable switching means shown as a manually operated controller 14 having short circuiting switches connected to the resistance 13 by four taps 15a to 15d. Similarly, a shunt field regulating resistor 16 is connected in series with the shunt field 12, this resistor being regulated by a manually operated controller 17 having short circuit switching means connected to the resistor 16 by means of four taps 18a to 18d.

The field excitation produced in the motor by the shunt winding 12 with its entire resistance 16 in series with it is the same as the field excitation produced by the series field winding 11 with its entire resistance 13 in circuit with it when the motor is operating at a regenerative braking speed, and also the stages of field excitation produced by the taps 18a to 18d on the resistance 16 are the same respectively as the stages produced by the series field resistance taps 15a to 15d. Furthermore, according to the invention, the resistances 13 and 16 are controlled simultaneously, for example, by connecting the controllers 14 and 17 together through a mechanical linkage 19 so that at all times during regenerative braking when the field winding 12 is deenergized by means of the transfer switch 20, the short circuit braking resistance 13 is prepared for short circuit braking to give the same braking effort so that irregular operation or jerks are not experienced during the transfer.

The switch 20 is operated by any suitable means shown as a voltage coil 21 and a current coil 22 such as described and claimed in a co-pending application of Leopold Janisch, deceased, now Patent No. 2,148,297, issued February 21, 1939, assigned to the same assignee as this application. The voltage coil 21 is connected between the high voltage side of the motor 10 and the supply conductor 23, connection being made with the conductor 23 through a suitable trolley 24. The series current coil 22 is connected in the regenerative circuit after the switch 20 has been picked up by the coil 21, the two coils when excited acting in the same direction. This connection of the series coil 22 is effected by a bridging contact 25 operated by the coil 21 when the coil is energized to bridge the contacts 26. As shown, the bridging contact and the transfer switch 20 are biased to their lowermost positions by gravity. A second bridging contact 27 operated by the coil 21 with the contact 25 closes a circuit between the contacts 28 to connect upper end of the resistor 16 to the high voltage side of the armature 10.

In the operation of the system, when the supply voltage is available and with sufficient excess voltage of the motor 10 acting as a generator to supply current to the dynamic braking resistor 13 over the supply voltage for which the coil 21 is adjusted, the coil 21 lifts the bridging contacts 25 and 27 and the switch 20 to their upper positions thereby establishing regenerative braking. The contact 25 short circuits the coil 21 through the current coil 22 so that the coil 21 is rendered ineffective but the switches are held in their uppermost positions by the current coil 22. When the voltage of the motor 10 acting as a generator has decreased by reason of decrease in speed so that the regenerative current has decreased to a predetermined minimum value, or in the event of interruption of the regenerative braking, the switches 20 and 25 and 27 drop to their lowermost positions whereby short circuit braking is established through the field winding 11 and resistance 13 or a portion of the resistance depending upon the adjustment of the controllers 14 and 17.

The braking effect during short circuit braking is improved by the connection after the regenerative braking has been stopped of the shunt field winding 12 directly to the trolley 24. This can be effected by means of a manually operated switch 29. By reason of this connection, an additional constant braking is obtained independent of the short-circuit braking current which has the effect of making the braking effort more steady at the last short circuit braking stages and is effective down to a lower speed.

What I claim as new and desire to secure by Letters Patent of the United States is:

1. The combination in an electric braking system for an electric motor provided with an armature, a series field winding and a separately excited field winding, of a dynamic braking resistor in series with said series field winding, switching means normally biased to connect said dynamic braking resistor and said series field winding in circuit with said armature for dynamic braking, and movable to disconnect said dynamic braking resistor and said series field winding from said armature and connect said armature and said separately excited field winding to a source of electrical supply for regenerative braking, and means responsive to a dynamic braking condition of said motor for operating said switching means for regenerative braking.

2. The combination in an electric braking system for an electric motor provided with an armature, a series field winding and a separately excited field winding, of a dynamic braking resistor in series with said series field winding, a field control resistor in series with said separately excited field winding, switching means normally biased to connect said dynamic braking resistor and said series field winding in circuit with said armature for dynamic braking, and movable to disconnect said dynamic braking resistor and said series field winding from said armature and connect said armature, said separately excited field winding and said field control resistor to a source of electrical supply for regenerative braking, and means responsive to the dynamic braking voltage of said motor for operating said switching means for regenerative braking.

3. The combination in an electric braking system for an electric motor provided with an armature, a series field winding and a separately excited field winding, of a dynamic braking resistor in series with said series field winding, a field control resistor in series with said separately excited field winding, switching means normally biased to connect said dynamic braking resistor and said series field winding in circuit with said armature for dynamic braking, and movable to disconnect said dynamic braking resistor and said series field winding from said armature and connect said armature, said separately excited field winding and said field control resistor to a source of electrical supply for regenerative braking, means responsive to the dynamic braking voltage of said motor for operating said switching means for regenerative braking, and means responsive to the regenerative braking current for controlling the operation of said switching means to reestablish dynamic braking.

4. The combination in an electric braking system for an electric motor provided with an armature, a series field winding and a separately excited field winding, of a dynamic braking resistor in series with said series field winding, a field control resistor in series with said separately excited field winding, switching means movable for connecting said armature and said separately excited field winding and said field control resistor to a source of electrical supply for regenerative braking and for connecting said dynamic braking resistor and said series field winding in circuit with said armature for dynamic braking, means for varying said field control resistor to regulate said regenerative braking and means for varying said dynamic braking resistor in a predetermined relation with said field control resistor to thereby adjust said dynamic braking resistor to give a dynamic braking effort substantially the same as the regenerative braking effort when said switching means is operated to transfer the connections to dynamic braking.

5. The combination in an electric braking system for an electric motor provided with an armature, a series field winding and a separately excited field winding, of a dynamic braking resistor in series with said series field winding, a field control resistor in series with said separately excited field winding, switching means movable for connecting said armature and said separately excited field winding and said field control resistor to a source of electrical supply for regenerative braking and for connecting said dynamic braking resistor and said series field winding in circuit with said armature for dynamic braking, means for varying said field control resistor to regulate said regenerative braking and means for varying said dynamic braking resistor in a predetermined relation with said field control resistor to thereby adjust said dynamic braking resistor to give a dynamic braking effort substantially the same as the regenerative braking effort when said switching means is operated to transfer the connections to dynamic braking, and means responsive to the regenerative braking current for operating said switching means.

6. The combination in an electric braking system for an electric motor provided with an armature, a series field winding and a separately excited field winding, of a dynamic braking resistor in series with said series field winding, a field control resistor in series with said separately excited field winding, switching means movable to a first position for connecting said armature and said separately excited field winding and said field control resistor to a source of electrical supply for regenerative braking and movable to a second position for connecting said dynamic braking resistor and said series field winding in circuit with said armature for dynamic braking, a voltage coil responsive to the difference between the voltage of said motor and the voltage of the supply source for operating such switching means to said first position, a current coil responsive to the regenerative braking current arranged to effect movement of said switching means to said second position in response to a predetermined minimum regenerative braking current, means for varying said field control resistor to regulate said regenerative braking, and means for varying said dynamic braking resistor in a predetermined relation with said field control resistor to thereby adjust said dynamic braking resistor to give a dynamic braking effort substantially the same as the regenerative braking effort when said switching means is operated to transfer the connections to dynamic braking.

7. The combination in an electric braking system for an electric motor provided with an armature, a series field winding and a separately excited field winding, of a dynamic braking resistor in series with said series field winding, a field control resistor in series with said separately excited field winding, switching means movable for connecting said armature and said separately excited field winding and said field control resistor to a source of electrical supply for regenerative braking and for connecting said dynamic braking resistor and said series field winding in circuit with said armature for dynamic braking, means for varying said field control resistor to regulate said regenerative braking and means for varying said dynamic braking resistor in a predetermined relation with said field control resistor to thereby adjust said dynamic braking resistor to give it dynamic braking effort substantially the same as regenerative braking effort when said switching means is operated to transfer the connections to dynamic braking, and means for connecting said separately excited field winding and said field control resistor to a source of electrical supply during dynamic braking.

ERNST DOZLER.